United States Patent [19]

Dieden et al.

[11] Patent Number: 5,226,303
[45] Date of Patent: Jul. 13, 1993

[54] LOCKING ARRANGEMENT BETWEEN A SELECTOR LEVER OF A TRANSMISSION AND AN IGNITION LOCK OF A MOTOR VEHICLE

[75] Inventors: Thomas Dieden, Wiernsheim; Edmund Sander, Leonberg; Bernd Plocher, Rottenberg; Norbert Reiss, Ingersheim, all of Fed. Rep. of Germany

[73] Assignee: Dr. Ing. h.c.F. Porsche AG, Fed. Rep. of Germany

[21] Appl. No.: 901,225

[22] Filed: Jun. 19, 1992

[30] Foreign Application Priority Data

Jun. 20, 1991 [DE] Fed. Rep. of Germany ....... 4120382

[51] Int. Cl.⁵ .............................................. B60R 25/06
[52] U.S. Cl. ........................................ 70/247; 70/252; 74/878; 180/336; 192/4 A
[58] Field of Search ................ 70/245, 247, 248, 251, 70/252; 74/878; 192/4 A; 180/336

[56] References Cited

U.S. PATENT DOCUMENTS

| | | | |
|---|---|---|---|
| 4,712,397 | 12/1987 | Niskanen | 70/248 |
| 4,724,722 | 2/1988 | Beauch et al. | 70/248 X |
| 4,905,802 | 3/1990 | Gotoh | 70/247 X |
| 4,959,982 | 10/1990 | Mauz et al. | 70/248 |

FOREIGN PATENT DOCUMENTS 0307846  3/1989  European Pat. Off. .
0373320  6/1990  European Pat. Off. .
0429792  6/1991  European Pat. Off. .
3842332  11/1989  Fed. Rep. of Germany .
4037542  7/1991  Fed. Rep. of Germany .

Primary Examiner—Lloyd A. Gall
Attorney, Agent, or Firm—Evenson, McKeown, Edwards & Lenahan

[57] ABSTRACT

A locking arrangement between a selector lever of a transmission and an ignition lock of a motor vehicle has a locking pawl, which is rotatably disposed in a selector lever block. The locking pawl, via a recess, form-lockingly reaches around a cam part arranged on the selector lever. When the selector lever is in the parking position, the cam part is rigidly connected with a button that is to be operated manually. In this case, a catch hook of the locking pawl engages into the moving path of a locking cam, which is arranged on the selector-lever-side end of a flexible linkage. The catch hook acts in a blocking manner, as long as the button is operated into a first position. When the button is not operated, the ignition lock, which by way of the linkage is connected with the locking cam, can be rotated into an inoperative position, whereby the locking cam fixes the locking pawl. The button cannot then be operated because the cam part is fixed by the recess. The selector lever is therefore blocked in the parking position and the ignition lock cannot be rotated into the inoperative position as long as the selector lever is not in the parking position.

7 Claims, 4 Drawing Sheets

LOCKING ARRANGEMENT BETWEEN A SELECTOR LEVER OF A TRANSMISSION AND AN IGNITION LOCK OF A MOTOR VEHICLE

BACKGROUND AND SUMMARY OF THE INVENTION

This application is related to application Ser. No. 07/901,036, filed on even date, and based on German Patent Application P 41 20 380.1; application Ser. No. 07/901,595 filed on even date, and based on German Patent Application P 41 20 379.8.

The present invention relates to a locking arrangement between a selector lever of a transmission and an ignition lock of a motor vehicle. The selector lever is held so that it can be swivelled into various positions and the selector lever, in a parking position, is lockable via a locking part. This locking part can be manually shifted via a button arranged on the selector lever. This locking part has a locking pawl which, by way of a flexible linkage interacts with the ignition lock in such a manner that the ignition key can only be pulled off in the inoperative position of the ignition lock when the selector lever is in the parking position and the button is not operated. The locking pawl, in this case, locks the locking part, so that the selector lever is locked in the parking position until after the ignition key has been rotated in the direction of a first operative position, whereby the locking pawl releases the locking part.

European Patent Document EP-0 307 846 A1, shows a locking arrangement of the above-mentioned type in which a button is arranged on a selector lever which is held on a selector lever block so that it can be swivelled into various positions. This button is to be operated manually and actuates a slidable locking part on the selector lever which engages in a recess of a gate assigned to the parking position. When the button is not operated, the selector lever is therefore locked in this parking position.

By way of a flexible linkage, an ignition lock acts upon a locking pawl disposed in the selector lever block in such a manner that the ignition lock with the ignition key can only be brought into an inoperative position permitting the pulling-out of the key when the selector lever is in the parking position and the button is not operated, in which case the locking pawl locks the locking part. On the other hand, the selector lever is locked in this parking position until after the ignition key has been turned in the direction of a first operative position, whereby the locking pawl releases the locking part. The button can then be operated, and the selector lever can be moved out of the parking position.

From the German Patent Document DE-38 42 332 C1, a locking arrangement is known in which a flexible linkage is arranged between the selector lever and the ignition lock. This flexible linkage is subjected to tensile stress at both ends by compression springs which are supported on the housing side. In this case, the spring power of the ignition-lock-side spring is higher than that of the selector-lever-side spring.

The risk of an intentional or unintentional misuse of such a locking arrangement where the ignition key can be pulled out without a locking of the selector lever in the parking position exists particularly when the person operating the motor vehicle can operate simultaneously with both hands the ignition key and the selector lever. This applies, for example, to motor vehicles whose ignition lock is arranged on the side of the steering wheel that is opposite the selector lever.

It is an object of the invention to provide a locking arrangement of the above-mentioned type in which an unauthorized pulling-out of the ignition key, while the parking position of the selector lever is not yet engaged, is avoided under all circumstances.

This and other objects are achieved by the present invention which provides a locking arrangement between a selector lever of a transmission and an ignition lock of a motor vehicle. The selector lever is held so that it can be swivelled into various positions. The arrangement includes a locking part which can be manually shifted by means of a button arranged on the selector lever so as to lock the selector lever in a parking position. A flexible linkage is connected to the ignition lock and has a selector-lever-side end with a locking cam that travels along a moving path. A locking pawl is connected with the flexible linkage and interacts with the ignition lock via the flexible linkage in such a manner that an ignition key can only be pulled out in an inoperative position of the ignition lock when the selector lever is in the parking position and the button is not operated. The locking pawl locks the locking part, and the selector lever is locked in the parking position until after the ignition key is rotated in the direction of a first operative position, with the locking pawl releasing the locking part. The locking pawl has a recess which formlockingly surrounds the locking part when the button is operated into a first position and the selector lever is in the parking position. The pawl also has a catch hook that engages with the locking cam connected with the selector-lever-side end of the linkage along the moving path of the locking cam such that the linkage is locked and the ignition key cannot be rotated into the inoperative position.

In the parking position of the selector lever, a locking part, which is constructed as a cam part, is form-lockingly surrounded by a recess of a locking pawl. When the button is operated, the cam part holds the locking pawl in a position in which a catch hook of the locking pawl engages in the moving path of a locking cam connected with the selector-lever-side end of a flexible linkage while locking the linkage. The thus locked linkage prevents a turning of the ignition key in the inoperative position of the ignition lock and therefore the pulling-out of the key and, for example, a catching of the steering wheel lock. The form-fitting reaching around by the cam part has the effect that, when the operated button is released, the cam part rotates the locking pawl, so that the catch hook is rotated out of the moving path of the locking cam. The linkage is released and the ignition key can be turned into the inoperative position, and the locking cam is moved on its moving path into a position fixing the catch hook. A pushing of the button will now not be possible because the locking pawl fixed by way of the catch hook holds fast the cam part by means of the recess.

An unintentional or unauthorized pulling-out of the ignition key, when the parking position is not yet engaged, is therefore avoided under all circumstances. When the button is pushed, in the parking position, as well as in all other selector lever positions, a pulling-out of the ignition key is securely prevented by the engaging of the catch hook. The form-fitting reaching around of the cam part causes a forced control of the locking pawl so that, in the event of an intentional pulling-out of the ignition key, the position of the selector lever and the operating of the button is sensed.

In particular, for motor vehicles in which the ignition lock is arranged on the side of the steering wheel situated opposite the selector lever and in which the person operating the motor vehicle can therefore operate the ignition key and the selector lever at the same time, no intermediate position of the ignition lock and of the selector lever can be found in which the ignition key can be pulled out before the parking position is engaged and the button is released.

Other objects, advantages and novel features of the present invention will become apparent from the following detailed description of the invention when considered in conjunction with the accompanying drawings.

DETAILED DESCRIPTION OF THE DRAWINGS

Figure 1:
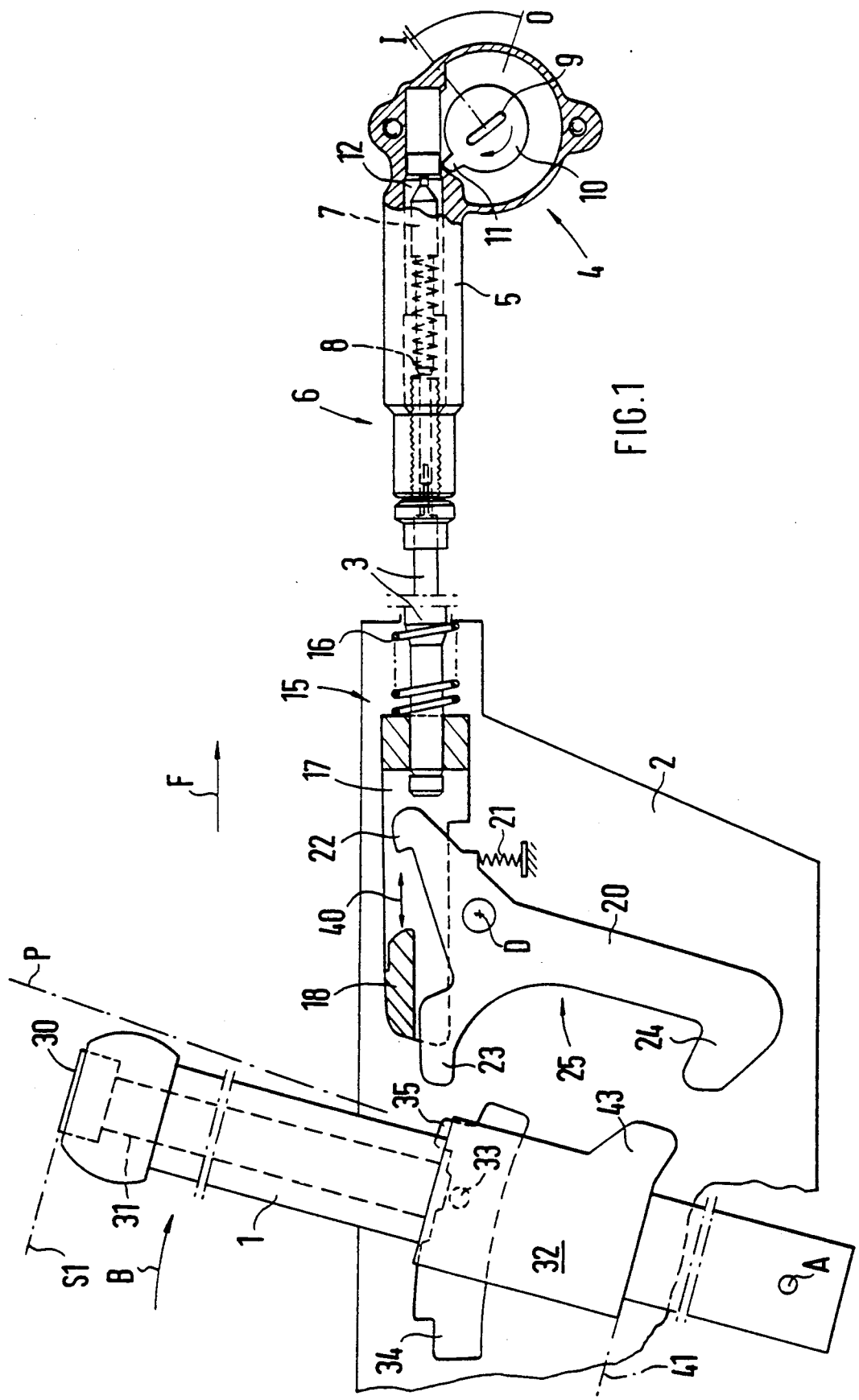
FIG. 1 is a schematic representation of a locking arrangement in the driving operation of a motor vehicle.

In a motor vehicle, a selector lever 1 for an automatic transmission, which is not shown, is disposed rotatably about an axis A in a selector lever block 2. By way of a flexible linkage 3, the selector lever block 2 is connected with an ignition lock 4 arranged in the proximity of a steering wheel which is not shown. This ignition lock 4 has a housing 5 on which the ignition-lock-side end 6 of the linkage 3 is held. In the housing 5, a spring 8 is supported which, by means of a spring force K1, acts on a slide 7 which is connected with the linkage 3 and is slidably disposed in the housing 5, the spring 8 exercising a tensile stress on the linkage 3.

In the housing 5, a disk 10 is arranged which can be rotated together with an ignition key 9 and which has a cam 11. The slide 7 has a receiving device 12 which corresponds with the cam 11.

On the selector-lever-side end 15 a spring 16, which is provided with a spring force K2, is supported in the selector lever block 2. Spring force K2 is higher than spring force K1. This spring 16 acts upon a sliding block 17, which is fixedly connected with the linkage 3, and therefore also exercises a tensile stress on the linkage 3. Adjacent to the selector lever 1, a locking cam 18 is molded onto the sliding block 17, such that the selector lever 1 can contact the locking cam 18, although not shown explicitly in the drawings for the sake of better illustration.

On the selector lever block 2, a locking pawl 20 is held which can be swivelled about the axis D and which, loaded counterclockwise by a slight spring power applied by a supporting spring 21, is held in the position illustrated in FIG. 1. The locking pawl 20 has a catch hook 22 facing the sliding block 17 as well as a recess 25 bounded by an upper and a lower arm 23 and 24 and facing the selector lever 1.

On the upper end of the selector lever 1, a button 30 is arranged which manually can be brought into two positions S1, S2 and which, in the inoperative condition, loaded by a spring, remains in the position S2. By way of a connecting member constructed as a rod 31, this button 30 is rigidly connected with a cam part 32 arranged on the selector lever 1 and facing the recess 25. A locking pin 33 is fixedly connected with the rod 31 and the cam part 32 and engages in a stationary gate 34 with a recess 35 assigned to a parking position P of the selector lever 1.

During the operation of the motor vehicle, the driving direction of the vehicle is the direction of the arrow F. According to FIG. 1, the ignition key 9 is in the ignition lock 4 which is rotated into a first operative position I. The spring 16 which is applied to the sliding block 17 bridges the spring 8, whereby the slide 7 remains in the position which prevents a rotating of the disk 10. The sliding block 17 is situated in its left end position, in which case the catch hook 22 engages in the moving path 40 of the locking cam 18 which is parallel to the direction F.

With the button 30, which is operated in a position S1, the selector lever 1 is swivelled in the direction of the movement arrow B. Because of the rigid coupling between the button 30 and the cam part 32, the cam part 32 together with the locking pin 33 is in a lower position 41 which corresponds to position S1.

Figure 2:
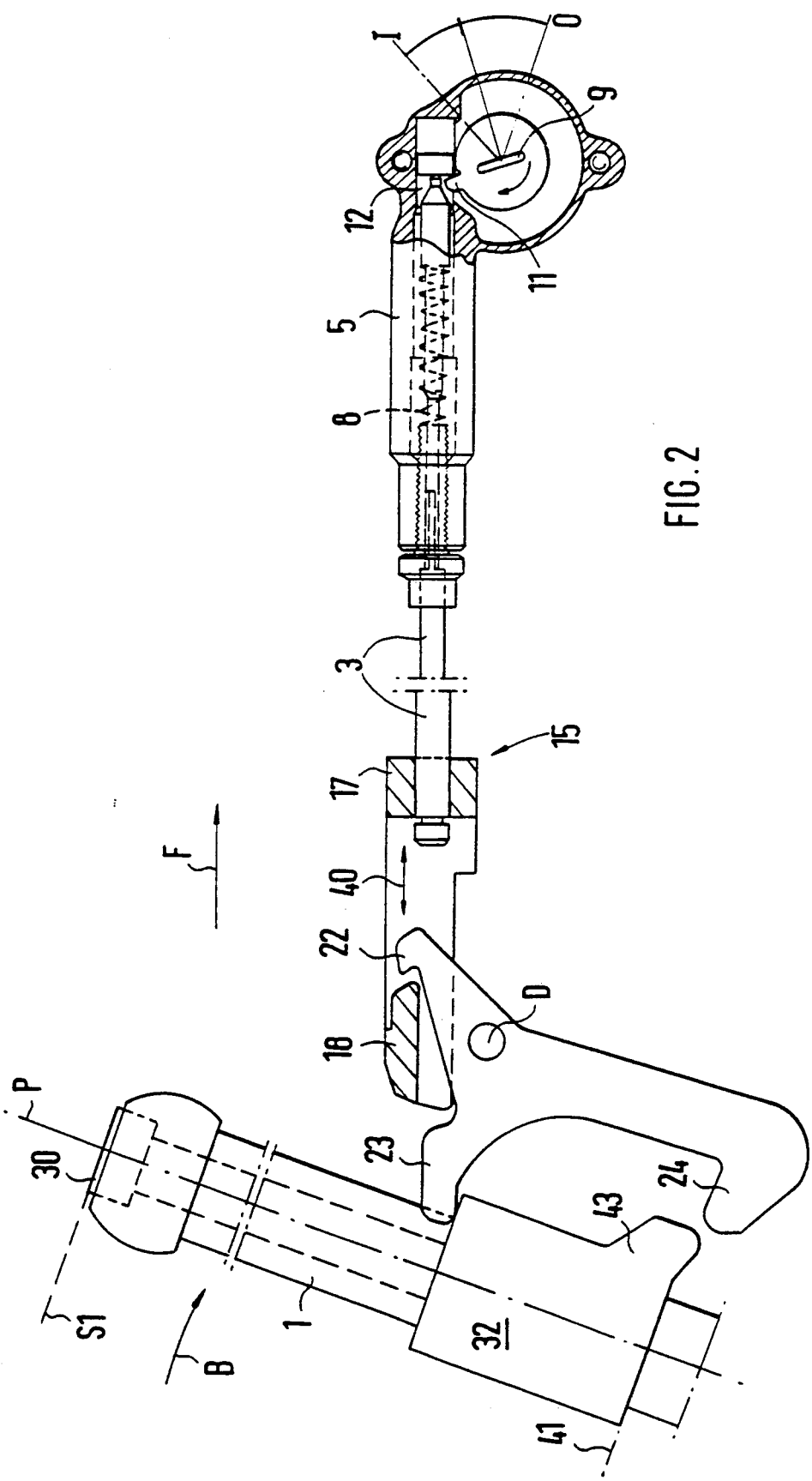
FIG. 2 is a schematic representation of some of the parts of the locking arrangement according to FIG. 1 with a selector lever in the parking position.

When, according to FIG. 2, the selector lever 1 is swivelled into the parking position P, the selector lever 1 pushes the sliding block 17 as a result of the contact with the locking cam 18 along its moving path 40 into the proximity of the catch hook 22. As a result, the spring 16 is upset, and the spring force K1 can push the linkage 3 in the direction F, whereby the cam 11 of the disk 10 engages in the recess 12.

At this point in time, the ignition key 9 can be turned from its first operative position I in the direction of the inoperative position 0 but without reaching it because, after a short rotation path, the locking cam 18 moves the linkage 3 in a locking manner into the catch hook 22.

The locking pawl 20 cannot rotate about its axis D in an escaping manner because, in the parking position P, the recess 25 reaches form-lockingly by means of the arms 23 and 24 around the cam part 32.

Figure 3:
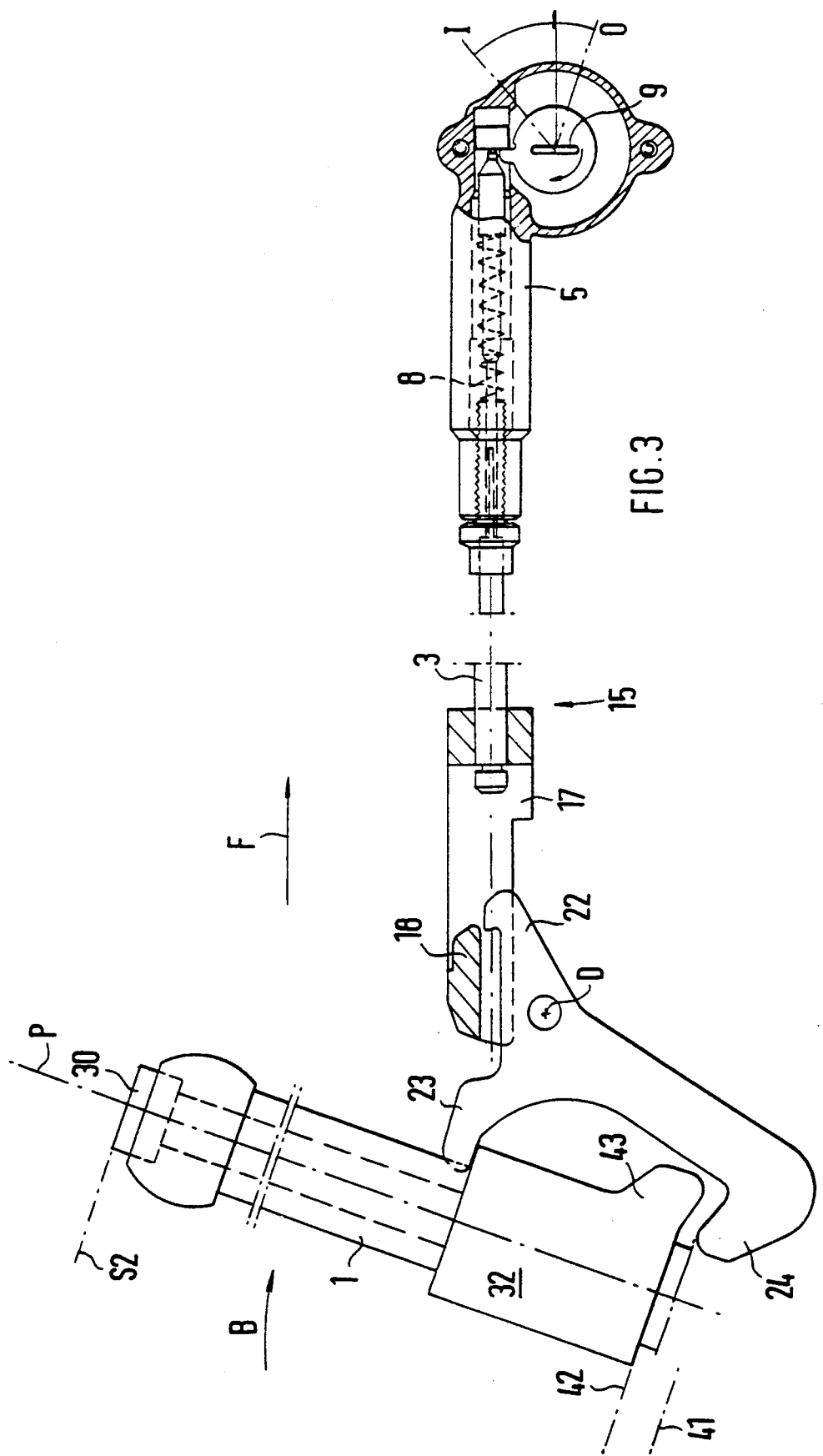
FIG. 3 is a schematic representation of some of the parts of a locking arrangement with a selector lever in the parking position similar to FIG. 2.

After the release of the button according to FIG. 3 into the inoperative position S2, the cam part 32 is shifted into the upper position 42 corresponding to position S2, in which case the locking pin 33 moves into the recess 35. In this case, the locking pawl 20 is rotated clockwise about the axis D, whereby the catch hook 22 is rotated out of the moving path 40.

Figure 4:
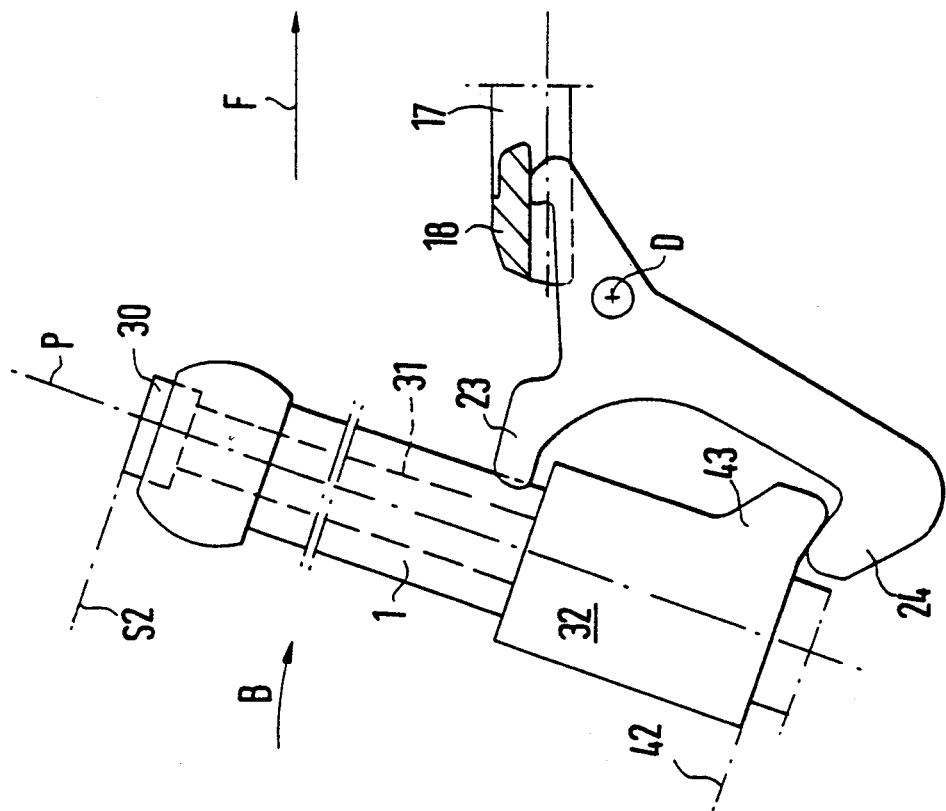
FIG. 4 is a schematic representation of some of the parts of a locking arrangement with a selector lever in the parking position and an ignition lock in the inoperative position.

Finally, according to FIG. 4, by means of the ignition key 9 by way of the cam 11, the linkage 3 can be moved into the right adjustment. In this case the ignition lock 4 reaches the inoperative position 0 which permits the pulling-out of the ignition key 9 and in which, for example, a steering wheel lock can engage.

The locking cam 18 is now in a position blocking the catch hook 22. As a result, the button 30 cannot be moved into position S1 because a cam 43 shaped onto the cam part 32 collides with the lower arm 24. The selector lever 1 is thus locked into the parking position P. Forces, which are introduced into the selector lever 1 by improper handling, for example, by a pulling with high forces on the selector lever 1 in order to leave the parking position P, are absorbed by way of the locking pin 33 and the recess 35. The locking pawl 20 as well as the linkage 3, in this case, are not acted upon by the forces.

When the motor vehicle is to become operative, after the insertion of the ignition key 9 into the ignition lock 4, a slight turning of the ignition key 9 in the direction of the operative position I releases the linkage 3 so that the spring 16 pushes the sliding block 17 into the position according to FIG. 1 which does not block the catch hook 22. After the button 30 is operated into the position S1, the selector lever 1 can be swivelled out of the parking position P. As a result, the catch hook 22, blocking the linkage 3, has therefore moved into the moving path 40 of the locking cam 18 so that a pulling-out of the ignition key 9 is impossible.

An intentional or unintentional misuse of the above-described locking arrangement by an operation of the ignition lock 4 and the selector lever 1 with both hands, and a position of the ignition lock 4 which permits the pulling-out of the ignition key, while the selector lever 1 with the inoperative button 30 is not in the parking position P, is excluded by the kinematic forced coupling of the above-described components.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A locking arrangement between a selector lever of a transmission and an ignition lock of a motor vehicle, the selector lever being held so that it can be swivelled into various positions, comprising:
    a locking pin and a gate having at least one recess, the locking pin being movable in said gate by the selector lever to selector transmission positions;
    a locking part, separate from said locking pin, which can be manually shifted by means of a button arranged on the selector lever so as to lock the selector lever in a parking position;
    a flexible linkage connected to the ignition lock and which has a selector-lever-side end with a locking cam that travels along a moving path;
    a locking pawl which interacts with the ignition lock via the flexible linkage in such a manner that an ignition key can only be pulled out in an inoperative position of the ignition lock when the selector lever is in the parking position and the button is not operated, with the locking pawl locking the locking part, and the selector lever being locked in the parking position until after the ignition key is rotated in the direction of a first operative position, with the locking pawl releasing the locking part;
    wherein the locking pawl has a recess which form-lockingly surrounds the locking part when the button is operated into a first position and the selector lever is in the parking position, and which also has a catch hook that engages with the locking cam connected with the selector-lever-side end of the linkage along the moving path of the locking cam such that the linkage is locked and the ignition key cannot be rotated into the inoperative position.

2. An arrangement according to claim 1, wherein when the button is inoperative and is in a second position, and the selector lever is in the parking position, the catch hook is positioned so that the locking cam does not engage the locking pawl.

3. An arrangement according to claim 2, wherein on an ignition-lock-side end of the linkage, a slide is arranged to which a first spring is applied which is supported in a housing, subjects the linkage to tensile stress and acts by means of a first spring force, and wherein on the selector-lever-side end of the linkage, a second spring is provided which acts upon the locking cam by means of a second spring force, and supports the linkage while subjecting it to tensile stress, the first spring force being less than the second spring force.

4. An arrangement according to claim 3, wherein when the ignition key is pulled out, the catch hook rests against the locking cam and prevents swivelling of the locking pawl, and the locking part rests against a lower arm bounding the recess which locks the button.

5. An arrangement according to claim 2, wherein when the ignition key is pulled out, the catch hook rests against the locking cam and prevents swivelling of the locking pawl, and the locking part rests against a lower arm bounding the recess which locks the button.

6. A locking arrangement between a selector lever of a transmission and an ignition lock of a motor vehicle, the selector lever being held so that it can be swivelled into various positions, comprising:
    a locking part, which can be manually shifted by means of a button arranged on the selector lever so as to lock the selector lever in a parking position;
    a flexible linkage connected to the ignition lock and which has a selector-lever-side end with a locking cam that travels along a moving path;
    a locking pawl which interacts with the ignition lock via the flexible linkage in such a manner that an ignition key can only be pulled out in an inoperative position of the ignition lock when the selector lever is in the parking position and the button is not operated, with the locking pawl locking the locking part, and the selector lever being locked in the parking position until after the ignition key is rotated in the direction of a first operative position, with the locking pawl releasing the locking part;
    wherein the locking pawl has a recess which form-lockingly surrounds the locking part when the button is operated into a first position and the selector lever is in the parking position, and which also has a catch hook that engages with the locking cam connected with the selector-lever-side end of the linkage along the moving path of the locking cam such that the linkage is locked and the ignition key cannot be rotated into the inoperative position;
    wherein on an ignition-lock-side end of the linkage, a slide is arranged to which a first spring is applied which is supported in a housing, subjects the linkage to tensile stress and acts by means of a first spring force, and wherein on the selector-lever-side end of the linkage, a second spring is provided which acts upon the locking cam by means of a second spring force, and supports the linkage while subjecting it to tensile stress, the first spring force being less than the second spring force.

7. An arrangement according to claim 6, wherein when the ignition key is pulled out, the catch hook rests against the locking cam and prevents swivelling of the locking pawl, and the locking part rests against a lower arm bounding the recess which locks the button.

* * * * *